US007441043B1

(12) United States Patent
Henry et al.

(10) Patent No.: US 7,441,043 B1
(45) Date of Patent: Oct. 21, 2008

(54) SYSTEM AND METHOD TO SUPPORT NETWORKING FUNCTIONS FOR MOBILE HOSTS THAT ACCESS MULTIPLE NETWORKS

(75) Inventors: Paul Shala Henry, Holmdel, NJ (US); Zhimei Jiang, Eatontown, NJ (US); Byoung-Jo J Kim, Morganville, NJ (US); Kin K Leung, Edison, NJ (US); Hui Luo, Marlboro, NJ (US); Nemmara K Shankaranarayanan, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 983 days.

(21) Appl. No.: 10/334,628

(22) Filed: Dec. 31, 2002

(51) Int. Cl.
 *G06F 15/173* (2006.01)
 *G06F 15/16* (2006.01)
(52) U.S. Cl. ...................... 709/238; 709/246
(58) Field of Classification Search ................. 709/238; 455/435.1
 See application file for complete search history.

(56) References Cited

U.S. PATENT DOCUMENTS

| | | | |
|---|---|---|---|
| 5,659,615 A * | 8/1997 | Dillon | 713/162 |
| 6,061,650 A | 5/2000 | Malkin et al. | |
| 6,137,791 A | 10/2000 | Frid et al. | |
| 6,240,514 B1 * | 5/2001 | Inoue et al. | 713/153 |
| 6,556,584 B1 | 4/2003 | Horsley et al. | |
| 6,571,289 B1 | 5/2003 | Montenegro | |
| 6,636,516 B1 | 10/2003 | Yamano | |
| 6,665,718 B1 * | 12/2003 | Chuah et al. | 709/225 |
| 6,708,218 B1 * | 3/2004 | Ellington et al. | 709/236 |
| 6,751,728 B1 | 6/2004 | Gunter et al. | |
| 6,785,256 B2 | 8/2004 | O'Neill | |
| 6,839,338 B1 | 1/2005 | Amara et al. | |
| 6,973,057 B1 | 12/2005 | Forslow | |

(Continued)

OTHER PUBLICATIONS

RFC 2002, IP Mobility Support.*

(Continued)

*Primary Examiner*—John Follansbee
*Assistant Examiner*—Joiya M Cloud

(57) ABSTRACT

An IP-based corporate network architecture and method for providing seamless secure mobile networking across office WLAN, home WLAN, public WLAN, and 2.5G/3G cellular networks for corporate wireless data users. The system includes Internet roaming clients (IRCs), a secure mobility gateway (SMG), optional secure IP access (SIA) gateways, and a virtual single account (VSA) server. The IRC is a special client tool installed on a mobile computer (laptop or PDA) equipped with a WLAN adaptor and a cellular modem. It is responsible for establishing and maintaining a mobile IPsec tunnel between the mobile computer and a corporate intranet. The SMG is a mobile IPsec gateway installed between the corporate intranet and the Internet. It works in conjunction with the IRC to maintain the mobile IPsec tunnel when the mobile computer is connected on the Internet via a home WLAN, a public WLAN, or a cellular network. The SIA gateway is a special IPsec gateway installed in the middle of the wired corporate intranet and an office WLAN. It works with the IRC to ensure data security and efficient use of corporate IP addresses when the mobile computer is connected to the office WLAN. The VSA server manages authentication credentials for every corporate user based on a virtual single account concept. The Internet Roaming system can provide secure, always-on office network connectivity for corporate users no matter where they are located using best available wireless networks.

4 Claims, 6 Drawing Sheets

U.S. PATENT DOCUMENTS

| | | | |
|---|---|---|---|
| 6,993,039 B2 | 1/2006 | Borella | |
| 7,016,948 B1 * | 3/2006 | Yildiz | 709/221 |
| 7,035,940 B2 | 4/2006 | Sahasrabudhe et al. | |
| 7,039,404 B2 | 5/2006 | Das et al. | |
| 7,058,059 B1 * | 6/2006 | Henry et al. | 370/395.1 |
| 7,068,635 B2 * | 6/2006 | Dempo | 370/338 |
| 7,107,464 B2 * | 9/2006 | Shapira et al. | 726/15 |
| 7,130,629 B1 * | 10/2006 | Leung et al. | 455/435.1 |
| 7,174,018 B1 | 2/2007 | Patil et al. | |
| 2002/0116502 A1 | 8/2002 | Iyer et al. | |
| 2002/0136226 A1 | 9/2002 | Christoffel et al. | |
| 2003/0108041 A1 | 6/2003 | Aysan et al. | |
| 2003/0172144 A1 * | 9/2003 | Henry et al. | 709/223 |
| 2003/0177396 A1 | 9/2003 | Bartlett et al. | |
| 2003/0212907 A1 | 11/2003 | Genty et al. | |

OTHER PUBLICATIONS

C. Perkins, "IP Mobility Support", Oct. 1996, RFC 2002, Network Working Group, pp. 1-57.

G. Montenegro, "Reverse Tunneling for Mobile IP, revised", Jan. 2001, RFC 3024, Network Working Group, pp. 1-22.

\* cited by examiner

SYSTEM AND METHOD TO SUPPORT NETWORKING FUNCTIONS FOR MOBILE HOSTS THAT ACCESS MULTIPLE NETWORKS

This application claims priority to U.S. patent application Ser. No. 10/021,172, filed Oct. 29, 2001, now issued U.S. Pat. No. 7,069,433; and currently abandoned U.S. patent application Ser. No. 10/026,589, filed Dec. 19, 2001, the disclosures of which are hereby incorporated herein as though fully set forth herein.

FIELD OF THE INVENTION

The present invention relates generally to mobile networking, and more particularly, to a system and method to support IP networking functions for mobile hosts that access multiple networks.

BACKGROUND

Corporate users often desire to connect their portable computers (laptops or PDAs) to office networks at anytime from anywhere using wireless technologies. Until now, they have relied upon cellular networks to provide such "anytime, anywhere" connectivity. The data rate over current cellular networks is usually modest, e.g., 19.2 kbps in CDPD networks. Although 3G cellular networks can support an aggregated data rate up to 2 Mbps for indoor/small cell or 384 kbps for wide area, it is unlikely that operators will allocate all the available bandwidth to serve data users, because voice is the major revenue source and thus most bandwidth will be reserved for voice calls. Therefore, it is expected that the practical data rate offered by 3G cellular networks will be on the order of 100 kbps, which may not satisfy data users. Now, corporate users who want high-speed wireless connection can look for help from another wireless technology—the IEEE 802.11 WLAN (wireless local area network).

802.11 WLAN, a high-speed wireless data network standardized by the IEEE, was designed as a wireless extension of Ethernet. Since the 1999 release of the IEEE 802.11 standard, the 802.11b WLAN has been widely deployed in offices, homes, and public hot spots such as airports and hotels. Any portable computer with a WLAN card installed can be connected to these WLANs at a data rate up to 11 Mbps. In addition to high speed, WLAN has a number of other advantages, including ease of deployment (because it uses unlicensed spectrum) and low equipment cost. However, a serious disadvantage of WLAN is the small coverage area. An ordinary 802.11b AP (access point) can only communicate with 802.11b WLAN stations no more than 300 feet away.

WLAN and cellular data can be considered to be complementary wireless networking technologies to each other. WLAN has high speed but covers a small area, while cellular data networks provide wide-area coverage but at lower speed. It is very logic to integrate WLAN with cellular data networks for users, especially corporate users, who need high-speed wireless connection as well as anytime anywhere wireless connectivity. Thus, if a corporate user is under the coverage of a WLAN, his/her computer is connected to the WLAN and then to an office network; if there is no WLAN available, the computer is connected to a cellular network and then to the office network.

Currently there are two types of WLAN/cellular network integration solutions. One is operator-oriented and the other is enterprise-oriented. The objective of operator-oriented solutions is to bundle public WLAN service with cellular data service for cellular operators, where the authentication and billing method of the public WLAN service can reuse the cellular network infrastructure and resources, and thus users may receive some benefits due to integration, such as SIM card-based authentication and single bill service. Operator-oriented solutions provide wireless Internet service to both corporate users and consumers, but they are not one-stop, hassle-free wireless networking solutions for corporate users. After obtaining a wireless connection to the Internet through a cellular network or a public WLAN, a corporate user needs to run a VPN program to create a secure connection to the office network over the wireless connection and the Internet. Every time the user switches the wireless connection due to, for example, moving in or out of the range of the public WLAN, the secure connection is torn down and the user has to re-launch the VPN program. In addition, since operator-oriented integration solutions cannot include office WLAN and home WLAN, corporate users roaming between these WLAN environments and the integrated public WLAN have to frequently change WLAN configurations, including setting SSID (Service Set Identifier), enabling/disabling/setting WEP (Wired Equivalent Privacy) keys, and selecting proper device-level and user-level authentication methods. It has been known that getting these configurations right is a difficult task, especially for users who are not WLAN professionals. In order to solve the above problems for corporate users, enterprise-oriented WLAN/cellular network integration solutions have been proposed. The objective is to provide a secure connection between a corporate user's portable computer and the corporate network with mobility support across cellular networks and various WLAN, including office WLAN, home WLAN, and public WLAN, where the secure connection can remain alive after the wireless connection is switched due to the user's movement. The enterprise-oriented solutions are also called mobile VPN techniques by a number of vendors.

SUMMARY OF THE INVENTION

The Internet Roaming system in accordance with an aspect of the present invention is an enterprise-oriented WLAN/cellular network integration solution that includes the following features: (1) a single sign-on authentication interface for a user to initiate the secure mobile networking experience, irrespective of the type of wireless network that is used to connect the user's computer; (2) an "always-on" office wireless networking environment for the user, no matter where the user is located and how the user's computer is connected to the office network; and (3) the ability for a system administrator to manage which wireless network a user can use to connect to the office network.

The Internet Roaming system is an IP-based corporate network architecture that provides seamless secure mobile networking across office WLAN, home WLAN, public WLAN, and 2.5G/3G cellular network for corporate wireless data users. It has up four primary components. These are Internet roaming clients (IRCs), a secure mobility gateway (SMG), optional secure IP access (SIA) gateways, and a virtual single account (VSA) server. The IRC is a special client tool installed on a mobile computer (laptop or PDA) equipped with a WLAN adaptor and a cellular modem. It is responsible for establishing and maintaining a mobile IPsec tunnel between the mobile computer and a corporate intranet. The SMG is a mobile IPsec gateway installed between the corporate intranet and the Internet. It works with the IRC to maintain the mobile IPsec tunnel when the mobile computer is connected on the Internet via a home WLAN, a public WLAN, or a cellular network. The SIA gateway is a special IPsec gateway installed in the middle of the wired corporate intranet and an office WLAN. It works with the IRC to ensure data security and efficient use of corporate IP addresses when the mobile computer is connected to the office WLAN. The VSA server manages authentication credentials for every corporate user based on a virtual single account concept. The Internet Roaming system can provide secure, always-on office network connectivity for corporate users no matter where they are located using best available wireless networks.

In accordance with an aspect of the invention, there is provided a method of routing packets between a first network access device connected to the Internet through a first access network, and a second network access device, the method being performed at a secure mobility gateway having at least one Internet interface and at least one intranet interface, comprising the steps of: receiving an encapsulated IP-in-UDP packet sent from the first network access device to the second network access device through the Internet interface, the IP packet being encrypted; locating a mobile status record for the first network access device; verifying the IP-in-UDP packet based on a parameter contained in the IP-in-UDP packet and, if the parameter is valid, then updating the mobile status record by replacing the current care-of IP address in the mobile status record with the outer source IP address of the IP-in-UDP packet, replacing the current interface in the mobile status record with the Internet interface if the current interface is the intranet interface for the first network access device, and replacing the packet sequence number for the first network access device in the mobile status record with the packet sequence number of the IP-in-UDP packet for the first network access device, if the packet sequence number of the IP-in-UDP packet is greater than the current packet sequence number stored in the mobile status record; decapsulating the IP-in-UDP packet; decrypting the IP packet; and sending the unencrypted IP packet to the second network access device through an Intranet interface, as if the first network access device is deployed on the subnet of the Intranet that is represented by the Intranet interface.

In accordance with another aspect of the invention, there is provided a method of routing packets between a first network access device connected to an Intranet through a private access network, and a second network access device, the method being performed at a secure IP access gateway and comprising the steps of: receiving an encapsulated IP-in-UDP packet sent from the first network access device to the second network access device at a secure IP access gateway disposed between the private access network and the Intranet, the IP packet being encrypted using a session key negotiated between the first network access device and the secure IP access gateway, and the entire IP-in-UDP packet having a message integrity code generated using another session key specified by the Security Association in a mobile status record in a secure mobility gateway; decrypting the IP packet at the secure IP access gateway, wherein the message integrity code of the IP-in-UDP packet remains unchanged; sending the encapsulated IP-in-UDP packet to the secure mobility gateway having an Internet interface facing the Internet, and an Intranet interface facing the Intranet; the IP-in-UDP packet being sent to the Intranet interface; locating a mobile status record using the Security Association Index number in the IP-in-UDP packet; verifying the message integrity code of the IP-in-UDP packet based on the Security Association; and if it is valid, then updating the mobile status record by replacing the current care-of IP address in the mobile status record with the outer source IP address of the IP-in-UDP packet, replacing the current interface in the mobile status record with the Internet interface if the current interface is the intranet interface for the first network access device, and replacing the packet sequence number for the first network access device in the mobile status record with the packet sequence number of the IP-in-UDP packet for the first network access device, if the packet sequence number of the IP-in-UDP packet is greater than the current packet sequence number stored in the mobile status record; decapsulating the IP-in-UDP packet at the secure mobility gateway; and sending the unencrypted IP packet to the second network access device through the Intranet interface, as if the first network access device is deployed on the subnet of the Intranet that is represented by the Intranet interface.

In accordance with yet another aspect of the invention, there is provided a method of routing packets between a first network access device connected to an Intranet through a private access network, and a second network access device, comprising the steps of: receiving an encapsulated IP-in-UDP packet sent from the first network access device to the second network access device at an access point on the first access network, the IP packet being encrypted by a link-layer encryption method; decrypting the IP packet at the access point; sending the encapsulated IP-in-UDP packet to a secure mobility gateway having an Internet interface facing the Internet, and an Intranet interface facing the Intranet; the IP-in-UDP packet being sent to the Intranet interface; locating a mobile status record using the Security Association Index number in the IP-in-UDP packet; verifying the message integrity code of the IP-in-UDP packet based on the Security Association; and if it is valid, then updating the mobile status record by replacing the current care-of IP address in the mobile status record with the outer source IP address of the IP-in-UDP packet, replacing the current interface in the mobile status record with the Internet interface if the current interface is the intranet interface for the first network access device, and replacing the packet sequence number for the first network access device in the mobile status record with the packet sequence number of the IP-in-UDP packet for the first network access device, if the packet sequence number of the IP-in-UDP packet is greater than the current packet sequence number stored in the mobile status record; decapsulating the IP-in-UDP packet at the secure mobility gateway; and sending the unencrypted IP packet to the second network access device through the Intranet interface, as if the first network access device is deployed on the subnet of the Intranet that is represented by the Intranet interface.

In accordance with another aspect of the invention, there is provided a method of connecting a network access device to a private network, the private network being connected to a secure mobility gateway located between the private network and the Internet, comprising the steps of: computing a decryption key from a user password; detecting an access network from a SSID broadcast by an access point; determining whether the access network is directly connected to the private network or connected to the private network via the secure mobility gateway, and further determining whether to use at least one of an Internet interface and an Intranet interface of the secure mobility gateway; decrypting an authentication credential stored on the network access device with the decryption key; sending an authentication frame to the access point, the authentication frame comprising the decrypted authentication credentials; and if authenticated by the access point, receiving a positive acknowledgment from the access point; decrypting authentication credentials stored on the network access device for remote access to the secure mobility gateway; and sending an authentication request to one of the Internet interface and the Intranet interface of the secure mobility gateway; receiving an authentication response from one of the Internet interface and the Intranet interface of the secure mobility gateway; establishing a secure IP tunnel with the one of the Internet interface and the Intranet interface of the secure mobility gateway.

The present invention will now be described in detail with particular reference to the accompanying drawings.

DETAILED DESCRIPTION OF THE PREFERRED EMBODIMENTS

Figure 1:
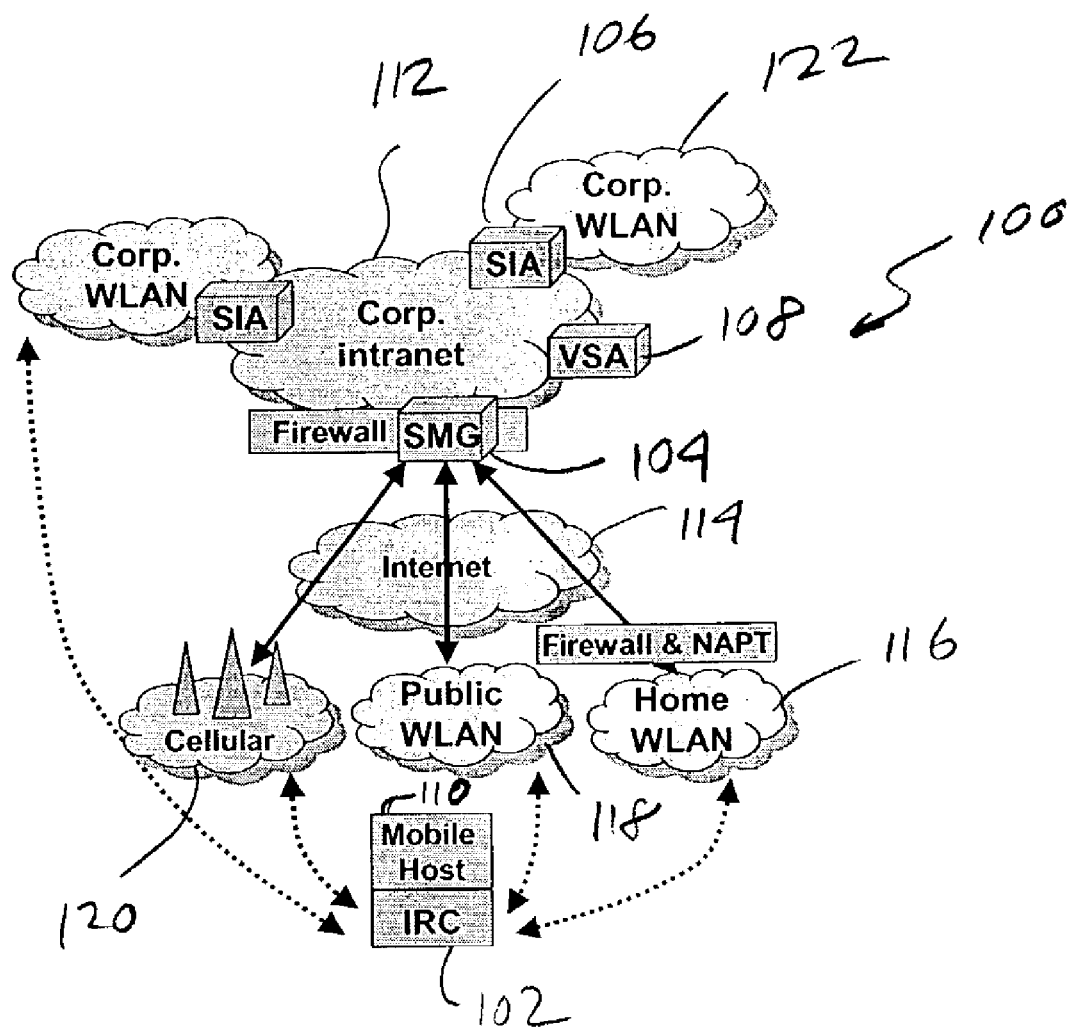
FIG. 1 is a high-level schematic of an Internet roaming system in accordance with an aspect of the invention.

FIG. 1 is a schematic overview of a high-level Internet Roaming system architecture 100. The exemplary embodiment comprises the following components: Internet roaming clients (IRCs) 102, a secure mobility gateway (SMG) 104, optional secure IP access (SIA) gateways 106, and a virtual single account (VSA) server 108. The IRC 102 is a special client tool installed on a corporate user's portable computer (network access device or mobile host) 110 equipped with a WLAN adaptor and a cellular modem. The IRC 102 presents a single sign-on interface for the user to initiate a simple, secure mobile networking experience. After the user submits the authentication credential, the IRC 102 is responsible for establishing and maintaining a mobile IPsec tunnel between the mobile host and a corporate intranet 112 through the best wireless network available to the user. The SMG 104 is a mobile IPsec gateway installed between the corporate network 112 and the Internet 114. The SMG 104 operates in conjunction with the IRC 102 to maintain the mobile IPsec tunnel when the mobile host is connected to the Internet 114 via a home WLAN 116, a public WLAN 118, or a cellular network 120. The SIA gateway 106 is a special IPsec gateway installed in the middle of the wired corporate intranet 112 and an office WLAN. It works with the IRC 102 to ensure data security when the mobile host is connected to the corporate WLAN 122. The VSA server stores authentication credentials for every corporate user based on a virtual single account (VSA) which is the backend support for the single sign-on user interface. Details of the VSA system are fully described in co-owned U.S. patent application Ser. No. 10/021,172, filed Oct. 29, 2001, the disclosure of which is hereby incorporated herein. A system administrator can control which type of wireless network a user can utilize to connect to the office network.

Figure 2:
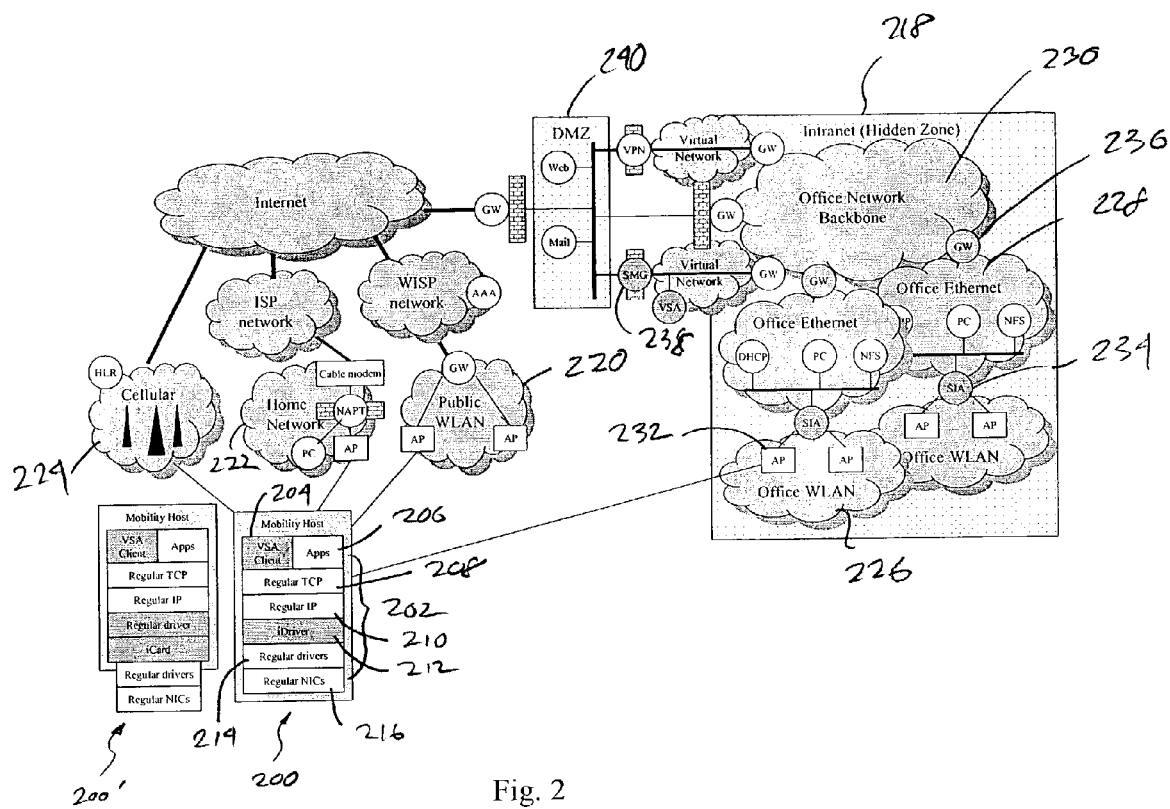
FIG. 2 is a schematic of the Internet roaming system as an add-on solution to an existing corporate Intranet.

Referring now to FIG. 2, there is depicted a detailed Internet Roaming system architecture. It is designed as an add-on solution with full backward compatibility. In this connection, the four primary components shown and described above can be deployed in an existing corporate intranet without requiring any changes to be made to the existing corporate intranet. Both mobile computers and non-mobile computers can access the network resources provided by the corporate intranet. The mobile host is shown at 200, and includes an illustrative protocol stack 202 that comprises a virtual single account (VSA) client 204, applications 206, a TCP layer 208, IP layer 210, internetworking driver 212, regular drivers 214; and network interface cards (NICs) 216. The functionality of the IRC is embodied in the internetworking driver 212 and VSA client 204. The VSA is described in co-owned U.S. patent application Ser. No. 10/021,172, filed Oct. 29, 2001, the disclosure of which is incorporated herein by reference. The internetworking driver implements networking functions and is described fully in co-owned U.S. patent application Ser. No. 10/138,129, filed May 5, 2002, the disclosure of which is incorporated herein by reference. Alternatively, the network access device may include an intelligent interface or "iCard" as described fully in co-owned U.S. patent application Ser. No. 10/026,589, filed Dec. 19, 2001. In that case, the IRC functions are performed by the intelligent interface. In order to manage remote access in a secure manner, the corporation typically requires all network access devices to belong to a subnet managed by a centralized mobile virtual private network (VPN) server that can be accessed in a limited way from outside the firewall. The network access device 200 can communicate with the company Intranet 218, public WLAN 220, home network 222 or cellular network 224. The Intranet 218 consists of office wide area wireless networks (WLANs) shown generally at 226, office Ethernets 228 and the office network backbone 230. Each WLAN has a plurality of access points (APs) 232 through which the network access device (or any appropriately configured network access device) can connect to the network. The APs 232 are connected to the Ethernets through a Secure IP Access (SIA) Server 234. The Ethernets 228 communicate with the office network backbone 230 through gateway routers 236. A SMG 242 is disposed between the extranet (DMZ) 244 and Intranet 246. The SMG 242 and SIA 234 are described in detail below.

The Internet Roaming system utilizes the following technologies: wireless access, IPsec, and Mobile IP. Wireless access obtains the best available wireless connection for a network access device. IPsec establishes a secure connection to the office network over the wireless connection and the Internet (or over the wireless connection only). Mobile IP keeps the secure connection alive when the wireless connection is switched from one wireless network to another.

One function of the IRC is to automate the process of obtaining a wireless connection from a cellular network, an office WLAN, a home WLAN, or a public WLAN. The access method for cellular data networks is relatively simple—it uses the standard modem interface. Thus, the IRC only needs to send AT commands to a serial port in order to create and use a cellular data connection. However, the WLAN access methods are full of diversity due to the diversity of WLAN security methods. Current WLAN access methods can be categorized into WEP-based, 802.1x-based, IPsec-based, and Web-based access methods. These are summarized below.

A. WEP-Based WLAN Access Method

The IEEE 802.11 standard (1999 release) only specified a simple WEP protocol for device-level authentication, access control, and encryption for WLAN. According to the standard, every WLAN station and every AP in a DS (Distribution System) may share a static WEP key. A WLAN station uses either open authentication or shared key authentication to authenticate itself with an AP before requesting to associate with the AP. Open authentication means no authentication. Shared key authentication is a challenge and response authentication method based on the shared WEP key. After the WLAN station is successfully authenticated to the AP and then successfully associated with the AP, if the WEP key is turned on, the data frames transmitted between the WLAN station and the AP are encrypted using per-frame keys derived from the WEP key, where the encryption algorithm is RC4. Unfortunately, the method of generating per-frame keys specified in WEP has a serious security flaw. A hacker can recover the WEP key after collecting a large number of encrypted data frames. In addition, the requirement that every WLAN and every AP must share one static WEP key makes it very difficult to use WEP in office WLAN environments, where access control must be implemented at the user level and thus every WLAN station must use a different WEP key to communicate with the AP.

Although WEP cannot support user-level authentication, it is useful in home WLANs and SOHO (Small Office Home Office) WLANs, where device-level authentication is sufficient because all WLAN devices belong to one user or a smaller number of users. On the other hand, TKIP (Temporal Key Integrity Protocol), a protocol proposed to fix the security flaw in the per-frame key generation of WEP, may replace WEP very soon and become the major WLAN security solution in these WLAN environments.

The IRC can automate the process of accessing a WLAN protected by WEP or TKIP. In these cases, the IRC only needs to load the SSID, the choice of device-level authentication method (e.g., the shared key authentication), and the WEP key to the WLAN adaptor driver; the rest of the process (i.e., authentication and association) will be handled automatically by the driver and the firmware on the WLAN adaptor.

B. 802.1x-Based WLAN Access Methods

The IEEE 802.1x standard specifies how to implement link-layer access control for IEEE LANs, including WLAN. It can be used to enforce user-level authentication and generate per-user per-session link-layer encryption keys for a WLAN that needs to support a large number of users, such as office or public installations.

Figure 3:
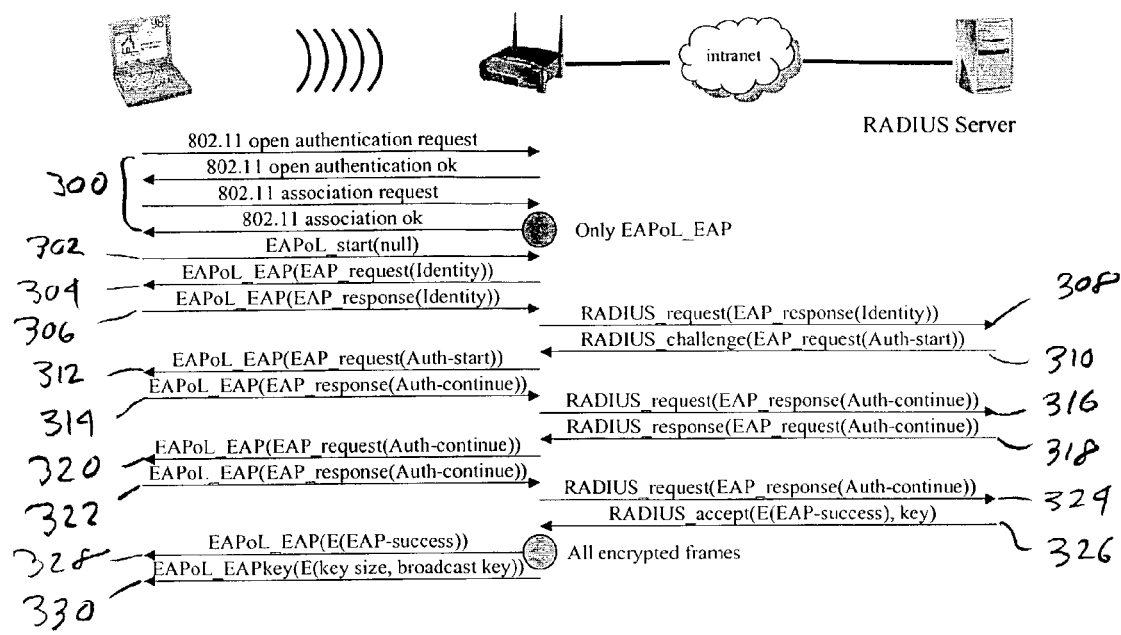
FIG. 3 is a flow diagram of an 802.1x-based authentication and key generation protocol.

The IEEE 802.1x standard defines three conceptual components to implement LAN authentication and access control. They are a supplicant, an authenticator, and an authentication server. In the context of an office WLAN or a public WLAN, the supplicant is a WLAN station, the authenticator is an AP, and the authentication server could be a centralized authentication server such as a RADIUS server. The IEEE 802.1x does not specify individual authentication protocols. Instead, it supports EAP (Extensible Authentication Protocol), a protocol that can carry any specific authentication protocol. The well-known EAP-carrying authentication protocols include LEAP (Lightweight EAP), PEAP, EAP-TLS, EAP-TTLS, EAP-AKA, EAP-SIM, etc. As shown in FIG. 3, an 802.1x-based WLAN access process consists of the following steps.

At 300, the WLAN station associates with the 802.1x-based AP using the open authentication method (i.e., no authentication) with WEP key turned off. At this point, even though the air link is established, the AP only forwards EAP messages between the WLAN station and the RADIUS server. The EAP messages are encapsulated in EAPoL (Extensible Authentication Protocol over LAN) frames when they are transmitted between the WLAN station and the AP, and in RADIUS messages between the AP and the RADIUS server.

At 302, the WLAN station initiates the EAP authentication by sending an EAPoL_Start frame to the AP.

At 304, the AP sends an EAP_request message (encapsulated in an EAPoL_EAP frame) to the WLAN station, which signals that the AP is 802.1x-based and thus understands the EAPoL protocol.

At 306, the WLAN station replies an EAP_response message (encapsulated in an EAPoL_EAP frame) to the AP. The AP decapsulates the EAP_response message from the EAPoL_EAP frame, encapsulates it into a RADIUS_request message, and forwards it to the RADIUS server at 308.

At 310, the RADIUS server selects an authentication protocol, and sends the start message of this authentication protocol to the AP, where the start message is encapsulated in an EAP_request message that itself is encapsulated in a RADIUS_challenge message. The AP decapsulates the EAP_request message from the RADIUS_challenge message, encapsulates it in an EAPoL_EAP frame, and forwards it to the WLAN station at 312.

At 314, the WLAN station follows the specified authentication protocol and sends a response message to the AP, where the response message is encapsulated in an EAP_response message that itself is encapsulated in an EAPoL_EAP frame. The AP decapsulates the EAP_response message from the EAPoL_EAP frame, encapsulates it into a RADIUS_request message, and forwards it to the RADIUS server at 316. If more authentication message exchanges are needed, they are handled as described in steps 5 and 6 and identified at steps 318-324.

After the last authentication message is exchanged, the RADIUS server can make a decision based on the submitted authentication credential. Assume it decides to admit the WLAN station. It then derives a per-user per-session key for link-layer encryption from the exchanged authentication messages (the same key can also be independently derived by the WLAN station). The key and an EAP_success message are encapsulated in a RADIUS_accept message. It is then sent to the AP at 326.

The AP retains the key, decapsulates the EAP_success message from the RADIUS_accept message, encapsulates it in an EAPoL_EAP frame, and forwards it to the WLAN station at 328. In addition, the AP encrypts the link-layer broadcast key and some key configuration parameters using the key, and sends the encrypted data in an EAPoL_key frame to the WLAN station at 330. Both the WLAN station and the AP then use the key to encrypt every data frame transmitted between them.

IEEE 802.1x does not address link-layer encryption. The ultimate link-layer encryption algorithm for WLAN will be determined by the forthcoming IEEE 802.11i standard, which could be AES. Currently, the known security flaws in WEP can be fixed using TKIP (Temporal Key Integrity Protocol) or WEP keys that are changed frequently, as implemented in LEAP. In addition, although the IEEE 802.1x standard does not require the authentication protocol to implement mutual authentication and key derivation, they must be implemented in the WLAN environment, as required by the IEEE 802.11i standard draft.

802.1x-based WLAN security solutions are suitable for office WLANs, where the appropriate authentication protocols are LEAP, PEAP, EAP-TLS, and EAP-TTLS. They are also useful for public WLANs integrated with cellular networks, where the appropriate authentication protocols are EAP-AKA and EAP-SIM. They may not suit independent public WLANs, because these require that a user have a pre-arranged account record in the authentication server's database. This is incompatible with an important business requirement for independent public WLANs, which is that they must serve walk-up users who do not already subscribe the public WLAN service and thus do not have pre-arranged accounts. In addition, 802.1x-based WLAN security solutions can be characterized as "overkill" for home WLANs.

There are two scenarios for the IRC to automate the process of accessing a WLAN protected by 802.1x-based authentication. If the WLAN adaptor driver supports 802.1x, the IRC only needs to load the SSID and the user's authentication credential to the driver; the rest of the process will be handled automatically by the driver and the firmware on the WLAN adaptor. If the WLAN adaptor driver does not support 802.1x, the IRC performs a more complex task: (1) the IRC loads the SSID in the driver, chooses open authentication method, and disables WEP key, so that the WLAN adaptor can associate with the AP; (2) the IRC finishes the mutual authentication and key derivation by exchanging EAPoL_EAP frames with the AP; and (3) after receiving the EAPoL_key frame, the IRC loads the generated key as the WEP key in the driver and enables the WEP key.

C. IPsec-Based WLAN Access Method

As result of widespread awareness of the WEP security flaw, IPsec-based WLAN access methods have been proposed to ensure security for the office WLAN. They are alternatives to 802.1x-based methods and have certain advantages, at least in part because 802.1x-based methods so far lack a standard link-layer encryption algorithm.

The basic idea of IPsec-based WLAN access methods is to deploy an IPsec gateway between an office WLAN and a wired office intranet and to run an IPsec client on every WLAN station in the office WLAN. Thus, data security of the office WLAN is ensured by IPsec, and no WLAN link-layer security mechanism is needed, although it may co-exist.

IPsec-based WLAN access methods must be carefully designed to prevent denial-of-service attacks. IPsec protocols were designed to secure IP packets transmitted over an untrusted intermediate IP network between two IPsec nodes. Since the intermediate IP network is not protected, it is vulnerable to denial-of-service attacks, and these cannot be addressed by IPsec protocols. In the office environment, where the WLAN is part of the corporate network, such vulnerability is unacceptable. An IPsec-based WLAN access method that can prevent denial-of-service attacks is proposed in this paper. It will be discussed when the functions of the SIA gateway are described.

In order to automate the process of accessing an office WLAN protected by an IPsec gateway, the IRC must know the WLAN configuration as well as the IP configuration. Assume the office WLAN uses open authentication as the link-layer authentication method, disables WEP key, and assigns IP address using DHCP. The automated office WLAN access process consists of the following steps: (1) the IRC loads the SSID in the WLAN driver, chooses the open authentication method, and disables WEP key, so that the WLAN adaptor can associate with the AP; (2) the IRC applies an IP address from the office WLAN using DHCP; and (3) the IRC creates an IPsec tunnel with the IPsec gateway using the IKE (Internet Key Exchange) protocol.

D. Web-Based WLAN Access Method

Figure 4:
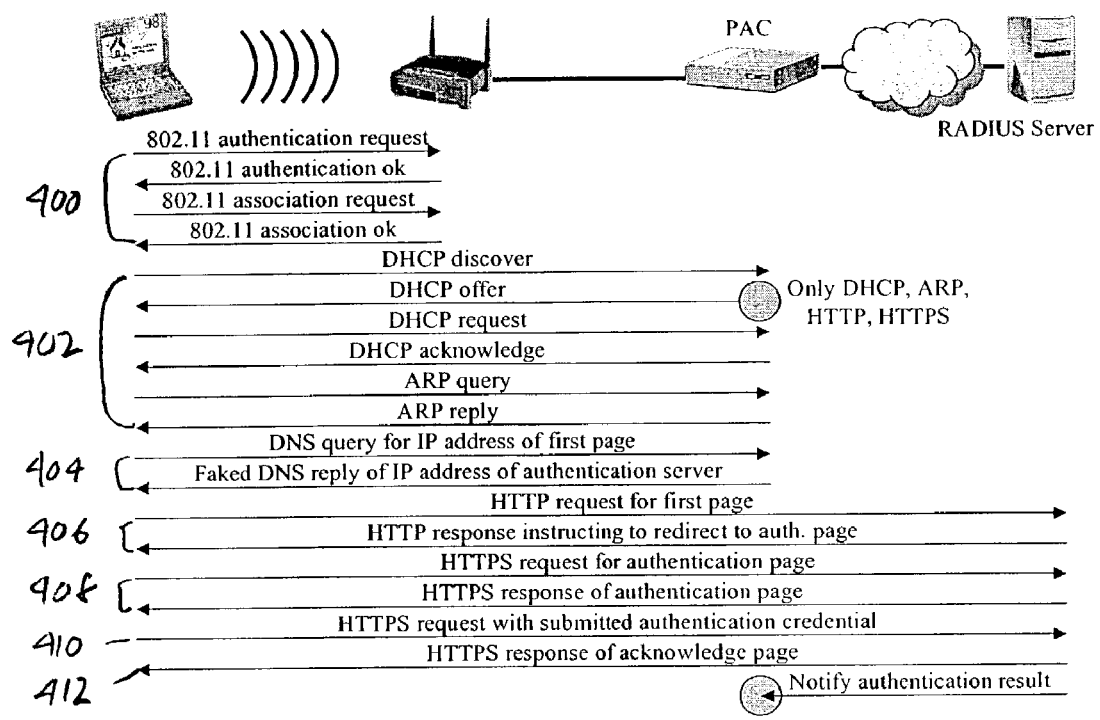
FIG. 4 is a flow diagram of a Web-based authentication protocol for public WLAN access.

In order to support walk-up users and provide on-site customer acquisition, a number of independent public WLAN operators have adopted a Web-based WLAN access technique. It may originate from some university projects on campus network access control. A large-scale network of public WLANs using this technique need to deploy a Web server as the centralized authentication server, called a Web-based authentication server. The key component that enforces authentication and access control is a special router installed behind every AP or a group of AP's, called a PAC (Public Access Controller). A typical Web-based WLAN process is described below, as shown in FIG. 4.

At 400 the user's WLAN adaptor associates with the 802.1x-based AP using the open authentication method (i.e., no authentication) with WEP key turned off.

At 402, the user's computer runs DHCP to receive an IP address and IP networking configurations from the public WLAN. The PAC serves as the DHCP server and the DNS server. As soon as it assigns the IP address to the user's computer, it creates a routing record in memory. The routing record contains the MAC address and IP address of the user's computer, and a routing state marked as "limited", which means the PAC will block all IP packets sent from/to this IP address except HTTP packets sent from/to the Web-based authentication server.

At 404, the user launches a Web browser. In order to find the IP address of the Web server that supplies the first page, the Web browser first sends a DNS query message to the PAC. The PAC returns the IP address of the Web-based authentication server to fool the user's Web browser. The TTL (Time-To-Live) field of this DNS reply is zero, which means the user's computer should not cache this DNS record because it is a fake answer.

At 406, the Web browser sends a HTTP request message to the Web-based authentication server to download the first page, as if the Web-based authentication server were the Web server that is identified by the URL of the first page. The Web-based authentication server sends back a short HTTP response message that asks the Web browser to re-send a HTTP request message to a new URL using HTTPS method (i.e., HTTP over SSL). The new URL points to the Web-based authentication server.

At 408 the Web browser creates a SSL connection with the Web-based authentication server, and then sends a HTTP request message to the Web-based authenticaton server over the SSL connection. The Web-based authentication server sends back a HTTP response message over the SSL connection, which contains a user authentication page and price information.

At 410 the Web browser renders the authentication page. If the user is a registered user, he/she can enter username and password in the authentication page. If the user is a first-time user, he/she can either open an account or make one-time payment in the authentication page. The result is sent back to the Web-based authentication server as a HTTP request message over the SSL connection.

At 412 the Web-based authentication server verifies the validity of the submitted information. If everything is OK, the Web-based authentication server sends back an acknowledge page to notify the user that his/her computer is connected to the Internet now. In the meantime, the Web-based authentication server instructs the PAC to change the state in the user's routing record from "limited" to "normal", and thus the PAC will no longer block this IP address. The Web-based WLAN access method does not implement link-layer encryption. A user's networking activities can be monitored by anyone using a WLAN sniffer such as Kismet in a distance of 100-300 feet.

The IRC can only automate the process of accessing a public WLAN for a registered user who has subscribed the public WLAN service. That is, the user already has a pre-arranged account at the public WLAN operator's database, which is protected by a username and a password. When the IRC discovers the user is under the public WLAN's coverage, it automatically submits the username and password to the Web-based authentication server for the user.

IP Security

IPsec refers to a suite of protocols that are designed to provide "interoperable, high quality, cryptographically-based security" for IP packets. The IPsec protocols include traffic security protocols and key management and exchange protocols. The security services offered by IPsec include access control, connectionless integrity, data origin authentication, protection against replays, confidentiality, and limited traffic flow confidentiality. These services are provided at the IP layer, offering protection for IP and/or upper layer protocols. The traffic security protocols specify how to encrypt IP packets transmitted in a secure connection between two IPsec nodes. The key management and exchange protocols specify how to create SA's (Security Association, i.e., encryption key and related parameters) for the secure connection.

IPsec is often used as a secure remote access technique. In this case, an IPsec client is installed on a user's computer, and an IPsec gateway is deployed between a corporate intranet and the Internet. The IPsec has two IP addresses, a home address and a local address. The home address is used as the source IP address by network applications running on the user's computer. It belongs to a subnet that can be reached through the IPsec gateway's intranet interface. The local address is the booting IP address of the user's computer. Every IP packet transmitted between the user's computer and any IP node communicating with it must go through the IPsec gateway. The routing between the IPsec gateway and the communicating IP node uses regular IP routing methods. The routing between the user's computer and the IPsec gateway uses an IPsec tunnel. That is, every IP packets transmitted between the IPsec client and the IPsec gateway is encrypted as the payload of a new IP packet; the IP addresses of the new IP packet are the local address and that of the IPsec gateway's Internet interface; and the IP addresses of the encrypted IP packet are the home address and that of the communicating IP node. The SA's for the IPsec tunnel is created usually using IKE.

Many IPsec implementations have replaced IP-in-IP encapsulation by IP-in-UDP encapsulation in order to enable IPsec tunnels to cross NAT (Network Address Translation) boxes. NAT boxes are popular in the SOHO (small office/home office) environment where only one publicly routable IP address is available from the ISP. In order to let many computers to share Internet connectivity, a NAT box is deployed between the ISP network and the SOHO network. The NAT box has a public interface and a private interface. The public interface is a host interface. The publicly routable IP address is assigned to it. The private interface is a network interface that connects to the SOHO network. The NAT box serves as the DHCP server for the SOHO network and supplies private IP addresses to the computers on the SOHO network. It also serves as the default gateway router for the SOHO network. When a computer on the SOHO network sends a packet to an IP node on the Internet, the packet is first sent to the NAT box. The NAT box then changes the source IP address of this packet from the computer's private IP address to the public IP address assigned to the public interface of the NAT box. Since the outbound IP packets of all computers on the SOHO network need to share this only public IP address, the NAT box must use different source port numbers to multiplex them, so that it will know the destination IP address of responding inbound IP packets should be replaced by which computer's private IP address according to the port numbers. Since IP-in-IP packets, as specified in IPsec tunnel mode, do not have port numbers, they may have problems when they cross NAT boxes.

In the Internet Roaming system disclosed herein, IP packets transmitted between the IRC and the SMG and between the IRC and the SIA gateway are protected by IPsec. The SA's used in the IRC-SMG tunnel are established using the IKE protocol. The SA's used between the IRC and the SIA gateway are established using proprietary DHCP extensions, which is a part of efforts to prevent denial-of-service attacks for office WLAN protected by IPsec.

3. IP Mobility

Mobile IP was proposed to support IP routing for a mobile computer that may frequently change its point of attachment from one subnet to another on the Internet. Mobile IP routing is similar to IPsec routing in the remote access scenario. According to Mobile IP, every mobile computer has two IP addresses, a home address and a care-of address (COA). The home address is used as the source IP address by network applications running on the mobile computer. It belongs to a subnet that serves as the home network for the mobile computer, on which a special router, called a Home Agent (HA), is deployed. The COA identifies the current point of attachment of the mobile computer to the HA, which may be the local IP address assigned to the mobile computer by the attached subnet. Whenever the mobile computer attaches to a new subnet, the new COA is reported to the HA. Thus the HA always knows where to route IP packets to the mobile computer. Every IP packet transmitted between the mobile computer and any IP node communicating with it must go through the HA. The routing between the HA and the communicating IP node uses regular IP routing methods. The routing between the mobile computer and the HA uses an IP tunnel. That is, every IP packet transmitted between the mobile computer and the HA is encapsulated as the payload of a new IP packet. The IP addresses of the new IP packet are the COA and that of the HA, and the IP addresses of the encapsulated IP packet are the home address and that of the communicating IP node. With the help of Mobile IP, any IP node can communicate with the mobile computer using existing Internet protocols as if the mobile computer were a regular IP node deployed on the home network.

Similarly, many Mobile IP implementations have replaced IP-in-IP encapsulation by IP-in-UDP encapsulation in order to ensure tunneled IP packets to cross NAT boxes.

In the Internet Roaming system, Mobile IP tunnel and IPsec tunnel are combined, due to their routing similarity. The IRC is thus a combination of a mobile client and an IPsec client. The SMG is a combination of an HA and an IPsec gateway.

The functions of the VSA server, the IRC, the SMG, and the SIA gateway are described in detail below.

1. Virtual Single Account Server

The VSA server stores authentication credentials for various wireless networks and the SMG for every corporate wireless user using a VSA account record. It contains the user's VSA username and password, a SMG profile, and a number of wireless network profiles. The SMG profile contains the user's remote-access username and password. Among the wireless network profiles, one is a cellular network profile, and others are WLAN profiles. Every wireless network profile is identified by a SSID (the cellular network profile's SSID is "cellular"). It contains configuration parameters, access parameters, and an authentication credential. In the cellular network profile, the configuration parameters include the serial port number, the number of starting bits, the number of data bits, the number of stopping bits, and the mode of parity code; the access parameters are the AT command sequences; and the authentication credential is a username and a password. In a WLAN profile, the configuration parameters include the SSID, the link-layer authentication method (open authentication or shared key authentication), the status of WEP key (on or off), the WEP key value, the WEP enhancement feature (40-bit WEP key, 128-bit WEP key, TKIP, 802.11i), the IP initialization method (DHCP, static IP), the IP configuration parameters (IP address, DNS server's IP address, default gateway router's IP address, etc.); the access parameters include the access method (WEP-based, 802.1x-based, IPsec-based, Web-based) and the supported authentication algorithm; the form of authentication credential is dependent on the access method and the authentication algorithm. For example, if the access method is WEP-based, the authentication credential is the WEP key value; if the access method is 802.1x-based and if the authentication algorithm is EAP-TLS, the authentication credential is a security certificate.

In all profiles, the authentication credential is encrypted using a key derived from the VSA password. Only random data can be used as authentication credentials (VSA username and password are exceptions) and only the random portion of authentication credentials are encrypted. For example, if an authentication credential is a security certificate, it cannot be encrypted entirely because it contains descriptive text; instead, the corresponding private key, which is a random sequence, is encrypted. The purpose of these rules is to avoid offline dictionary attacks against the VSA password in case the mobile computer that contains the VSA account record is lost. If the encrypted authentication credentials are random, a hacker cannot tell whether the dictionary attack succeeds, and thus he/she has to try it online, which takes much longer time and can trigger alarm easily.

A user's VSA account record is established by a system administrator based on the job requirement of the user. For example, if the user is not authorized to use a cellular network, no cellular network profile is configured in the user's VSA account record. In addition, all authentication credentials, including usernames and passwords, in the user's VSA account record are generated using random numbers when the system administrator creates them. The user does not need to remember them, and even does not know them.

The VSA functions are jointly supported by the IRC installed on the user's computer and the VSA server deployed on the corporate intranet. In the beginning when the IRC has only an empty VSA account record, the user is given a VSA username and a temporary VSA password. He/she can use this password to start the IRC using a wired connection in the office network. After the IRC discovers the VSA account record is empty, it directly contacts the VSA server to download the VSA account record, and requires the user to change the temporary VSA password. The IRC does not store the VSA username and password on the user's computer. When the IRC owns a non-empty VSA account record, every time after the user successfully creates a secure connection to the SMG, the IRC contacts the VSA server to update it. Thus, if the system administrator makes any change, it will be automatically synchronized to the IRC in the first available chance.

The VSA concept is the foundation that supports the single sign-on interface for a user to start a simple, hassle-free secure mobile networking experience, no matter what kind of wireless network is used and how the user's computer is connected to the office network.

2. Internet Roaming Client

The IRC is responsible for creating and maintaining a mobile IPsec tunnel between the user's computer and the corporate network using the best available wireless network, so that the user always has the same office network environment when he/she uses the computer at any location. This task includes identifying the best available wireless network around the user, making proper configurations in order to connect to the wireless network, authenticating the user or the user's computer to the wireless network, creating a secure wireless connection if necessary, authenticating the user to the corporate network, creating a secure connection to the corporate network, performing the handoff between wireless networks, and providing secure IP mobility routing support for the user's computer. All these are done without the operating system's awareness; that is, from the viewpoint of the operating system, the user's computer always uses a static IP address belonging to the corporate network since it is booted, as if it were a desktop computer sitting in the office. Therefore, the office network environment can be exactly reproduced for the user no matter where he/she is, and all networking applications on the user's computer can be running without any compatibility problem, as if they were running in the office environment (except the speed difference).

The IRC can be implemented using hardware or software. This is described more fully in co-owned U.S. patent application Ser. No. 10/026,589, the disclosure of which is incorporated by reference herein. If it is implemented using hardware, it looks like an Ethernet card to the user's computer, but actually contains a mobile IPsec gateway in the card. This mini gateway has three network interfaces. The one facing the user's computer is an Ethernet interface. The other two are a WLAN interface and a cellular network interface. If it is implemented using software, it can be implemented as, for example, an NDIS internetworking driver. It presents an Ethernet interface to the operating system of the user's computer, but actually drives a WLAN card and a cellular modem underneath. The functions performed by the IRC are described below.

Initially, the IRC presents a single sign-on interface for the user to start creating a secure connection to the office network. This interface is the same no matter where the user is located. The user only needs to remember the VSA username and password to start connecting his/her computer to a wireless network and then to the SMG, although the wireless network and the SMG use different authentication method with different authentication credentials. The IRC first identifies the best available wireless network around the user. This is done by instructing the WLAN driver to scan the SSID's of nearby WLANs. Normally, the priority order (from high to low) is office WLAN, home WLAN, public WLAN, and cellular network. If a detected SSID matches an SSID in a WLAN profile in the VSA account record, the IRC will use this WLAN as the wireless network; it loads the WLAN configuration parameters into the WLAN driver, so that the WLAN adaptor can associates with the AP. If there is no matched SSID, the IRC will use the cellular network as the wireless network. The IRC takes the entered VSA password as input to compute a key and then uses the key to decrypt the authentication credentials needed by the wireless network and the SMG. The real authentication processes can be automated without the user's involvement. That is, the IRC will authenticate the user to the wireless network using the access method specified in the WLAN profile to obtain the wireless connection, and then authenticate the user to the SMG to create the secure connection. In addition to the convenience of use, the single sign-on feature also improves security performance for the Internet Roaming system. For example, if a hacker steals a user's VSA username and password over the user's shoulder, the hacker cannot connect his/her computer to the user's office network even with the same IRC hardware or software installed, because there is no VSA account record stored on the hacker's computer.

As soon as the user successfully creates a secure connection to the office network, the IRC contacts the VSA server and automatically updates the VSA account record.

Figure 5:
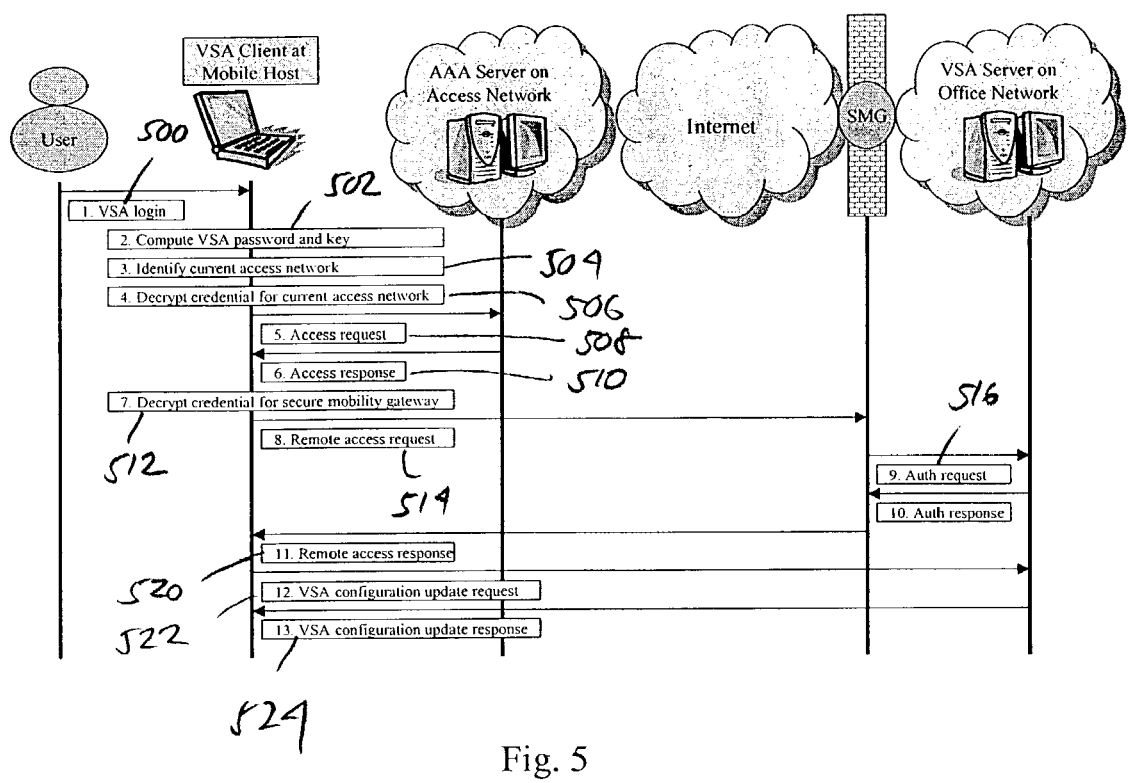
FIG. 5 is a flow diagram of a process in accordance with an aspect of the invention for creating a secure connection between a mobile host and a corporate network.

Referring now to FIG. 5, there is depicted a flow diagram showing how the IRC takes the VSA username and password from a user via the single sign-on interface, automatically creates a secure connection to the user's corporate network over a wireless network and the Internet, and updates the user's VSA account record. A step-by-step description of an exemplary application follows.

A user turns on his/her computer at a home where a WLAN is deployed. After the computer is booted, at 500 the IRC presents the single sign-on interface and the user enters his VSA username and password.

At 502 the IRC computes a key from the entered VSA password.

At 504 the IRC detects the home WLAN according to the SSID broadcast by the AP as the current access network.

In this scenario, the authentication credential to the home WLAN is the WEP key, which has been stored on the user's computer after being encrypted using the user's VSA key. At 506 the IRC decrypts the WEP key using the key derived from the entered VSA password.

The IRC loads the SSID and the computed WEP key to the WLAN adaptor and instructs the WLAN adaptor to associate with the AP. The WLAN adaptor sends an authentication frame (access request) to the AP at 508, and the AP replies with a challenge in an authentication frame at 510.

The WLAN adaptor computes a response based on the computed WEP key, and sends the response in an authentication frame to the AP. Assume the entered VSA password is correct, thus the WEP key is correct, and thus the response is correct. The AP sends an OK signal in an authentication frame to the WLAN adaptor. The WLAN adaptor can then associates with the AP, and the user's computer is connected to the Internet through the home WLAN.

Using the key derived from the entered VSA password, the IRC then decrypts the authentication credential for remote access to the SMG at 512.

At 514 the IRC sends an authentication request to the public interface of the SMG.

At 516 the authentication request is forwarded to the VSA server through the SMG's private interface.

At 518 the VSA server processes the authentication request, where multiple authentication messages may be exchanged, and then the VSA server decides to admit the user's computer. It returns a positive acknowledgement signal to the user's computer and passes the session key generated in the authentication process to the SMG's private interface.

At 520 the positive acknowledgement signal is relayed to the user's computer through the SMG's public interface. Meanwhile, the session key is passed to the SMG. The IRC should be able to compute the same session key based on exchanged authentication messages. A secure IP tunnel is then built between the user's computer and the SMG's public interface based on the session key, which goes through the home WLAN and the Internet.

As soon as the secure IP tunnel is established, at 522 the IRC sends a VSA update request to the VSA server.

At 524 the VSA server sends back a response containing the new account information for various wireless access networks.

After a secure connection to the office network is established, the IRC keeps monitoring the WLAN coverage. If a better wireless network is found, the IRC uses the key derived from the entered VSA password to decrypt the authentication credential needed by the new wireless network, and performs the authentication automatically. After obtaining the wireless connection through the new wireless network, it reports the new COA to the SMG, thus the mobile IPsec tunnel can remain alive. This is done without the operating system's awareness, that is, from the viewpoint of the operating system, the user's computer always uses a static IP address belonging to the corporate network since it is booted.

When the secure connection to the office network is stable (i.e., not in a handoff process), the IRC works with the SMG to provide mobile IPsec routing for the user's computer without the operating system's awareness. The following description summarizes three connection scenarios, each corresponding to a different routing method.

In the first scenario, the user's computer is connected to the Internet through a home WLAN, a public WLAN, or a cellular network. During the outbound routing process: (1) the operating system sends an IP packet to an IP node (called a correspondent IP node hereinafter) that is communicating with the user's computer (the IP packet is actually sent to the network driver or the network card presented by the IRC); (2) the IRC receives this IP packet, encrypts it, encapsulates the encrypted IP packet into a UDP packet, and sends the IP-in-UDP packet to the SMG's Internet interface (the IP-in-UDP packet is actually sent to the default gateway router of the wireless network, which then routes it to the SMG's Internet interface); and (3) after receiving the IP-in-UDP packet, the SMG decapsulates it, decrypts the inner IP packet, and forwards the decrypted IP packet to the correspondent IP node using the intranet interface (the decrypted IP packet is actually sent to the next-hop router in the corporate intranet, which then routes it to the correspondent IP node), as if the user's computer is deployed on the subnet of the corporate intranet that is represented by this interface. Similarly, during the inbound routing process: (1) an IP packet, of which the destination IP address is the mobile computer's home IP address, arrives at the SMG's intranet interface according to the Internet routing protocols; (2) the SMG encrypts it, encapsulates the encrypted IP packet into an UDP packet, and forwards the IP-in-UDP packet to the IRC (the IP-in-UDP packet is actually sent to the next-hop router on the Internet, which then routes it to the care-of IP address of the user's computer); (3) after receiving the IP-in-UDP packet, the IRC decapsulates it, decrypts the inner IP packet, and passes the decrypted IP packet to the operating system.

Figure 6:
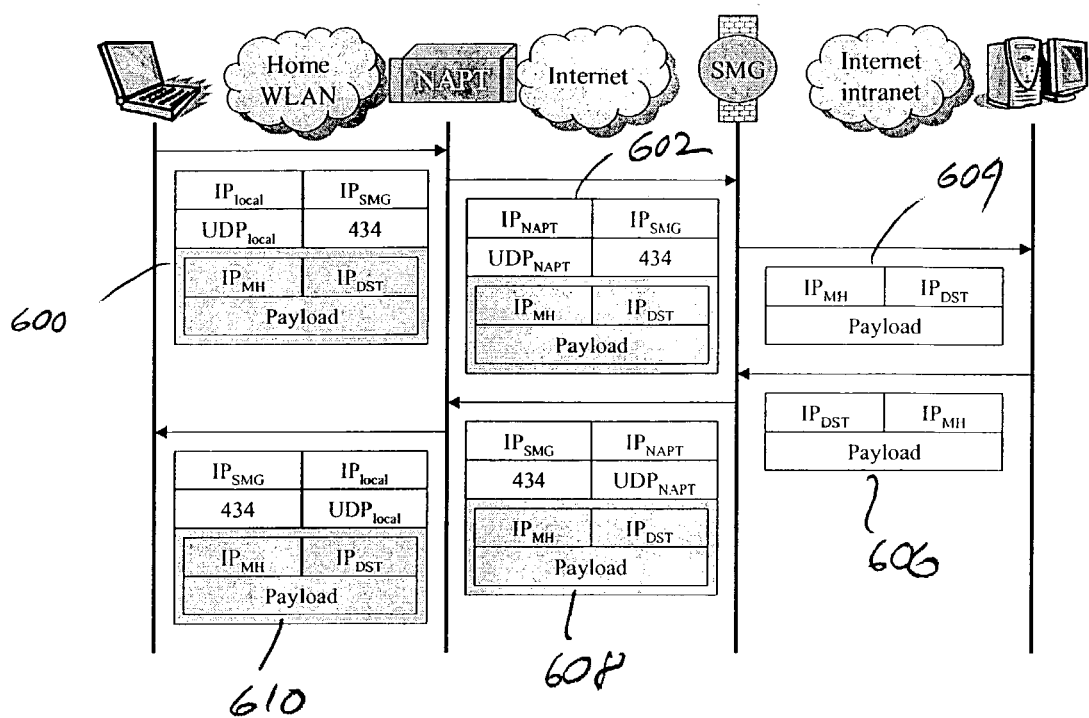
FIG. 6 is a flow diagram of a routing example in accordance with an aspect of the invention.

Referring now to FIG. 6, there is depicted a flow diagram showing how an outbound IP packet and a corresponding inbound IP packet are routed between a user's computer and an IP node communicating with the user's computer in the above scenario, where the wireless network is a home WLAN connected to the Internet through a NAT (Network Address Translation) box. Note that although the NAT box changes the source IP address and source UDP port for the outbound IP packet as well as the destination IP address and destination UDP port for the inbound IP packet, the mobile IPsec tunnel still works. This is why IP-in-UDP encapsulation method is adopted in the Internet Roaming system.

In the flow diagram of FIG. 6, it is assumed that the user's computer sends an IP packet to an IP host on the Internet and then that IP host returns an IP packet to the user's computer. The IP host's address is $IP_{DST}$. As mentioned before, the operating system of the user's computer "thinks" the user's computer is directly connected to the corporate intranet, so the operating system uses $IP_{MH}$ as the IP address of the user's computer. In fact, the IRC also obtains a local IP address for the user's computer. It is assigned by the NAT box, denoted as $IP_{local}$. Assume the public IP address of the NAT box is $IP_{NAPT}$; and the IP address of the SMG's public interface is $IP_{SMG}$. The IP packet exchange consists of the following steps.

The user's computer sends an IP packet to an IP host, in which the source and destination IP addresses are $IP_{MH}$ and $IP_{DST}$ respectively. At 600 the IRC encapsulates this IP packet in a UDP packet, in which the source and destination IP addresses are $IP_{local}$ and $IP_{SMG}$ respectively and the source and destination UDP port numbers are $UDP_{local}$ and 434 (the port number used by Mobile IP) respectively. The IRC then sends this IP-in-UDP packet to the inner interface of the NAT box.

At 602 the NAT box changes the source IP address from $IP_{local}$ to $IP_{NAPT}$, changes the source UDP port number from $UDP_{local}$ to a unique UDP port number $UDP_{NAPT}$, and then sends the changed IP-in-UDP packet to the public interface of the SMG over the Internet. In the meantime, the NAT box builds a record in the Address Translation Table, which maps $UDP_{NAPT}$ to ($UDP_{local}$, $IP_{local}$).

At 604 the SMG decrypts the inner IP packet and forwards it to the IP host through the private interface. Since the IP host is on the Internet, this IP packet needs to cross the corporate firewall.

After receiving the IP packet, at 606 the IP host sends back an IP packet, in which the source and destination IP addresses are $IP_{DST}$ and $IP_{MH}$ respectively. Since the $IP_{MH}$ belongs to the corporate intranet, this IP packet is routed to the corporate intranet and needs to cross the firewall. The firewall does not block this IP packet because the IP packet exchange was initiated by the user's computer using the internal IP address $IP_{MH}$. After this IP packet enters the corporate intranet, it is routed to the SMG's private interface because this is the router's interface that presents the subnet to which $IP_{MH}$ belongs.

After receiving the IP packet from the private interface, the SMG encrypts it and encapsulates it into a UDP packet, in which the source and destination IP addresses are $IP_{SMG}$ and $IP_{NAPT}$ respectively and the source and destination UDP ports are 434 and $UDP_{NAPT}$ respectively, because $IP_{NAPT}$ and $UDP_{NAPT}$ were reported as the care-of IP address and port number for the user's computer using the enhanced Mobile IP registration message before.

After receiving the IP-in-UDP packet, at 608 the NAT box looks for the Address Translation Table and finds the private destination IP address for this IP-in-UDP packet is $IP_{local}$. It then changes the destination IP address of the IP-in-UDP packet from $IP_{NAPT}$ to $IP_{local}$, changes the destination UDP port number of the IP-in-UDP packet from $UDP_{NAPT}$ to $UDP_{local}$, and forwards the changed IP-in-UDP packet to the user's computer over home WLAN at 610.

In the second scenario, a user's computer is connected to an office WLAN with a SIA gateway deployed. The outbound routing process is as follows: (1) the operating system sends an IP packet to a correspondent IP node; (2) the IRC receives this IP packet, encrypts it, encapsulates the encrypted IP packet into a UDP packet, and sends the IP-in-UDP packet to SMG's intranet interface; (3) when the IP-in-UDP packet passes through the SIA gateway, the SIA gateway decrypts the inner IP packet and forwards the IP-in-UDP packet to the SMG's intranet interface; and (4) after receiving the IP-in-UDP packet, the SMG decapsulates it and forwards the inner IP packet to the correspondent IP node using the intranet interface. Correspondingly, the inbound routing process is as follows: (1) an IP packet, of which the destination IP address is the mobile computer's home IP address, arrives at the SMG's intranet interface according to the Internet routing protocols; (2) the SMG encapsulates it into an UDP packet and forwards the IP-in-UDP packet to the IRC; (3) when the IP-in-UDP packet passes through the SIA gateway, the SIA gateway encrypts the inner IP packet and forwards it to the IRC; and the (4) after receiving the IP-in-UDP packet, the IRC decapsulates it, decrypts the inner IP packet, and passes the decrypted IP packet to the operating system.

In a third scenario where the user's computer is connected to an office WLAN without a SIA gateway deployed, but where the office WLAN may be protected by, for example, an 802.1x-based method, the outbound routing process is as follows: (1) the operating system sends an IP packet to a correspondent IP node; (2) the IRC receives this IP packet, encapsulates it into a UDP packet, and sends the IP-in-UDP packet to SMG's intranet interface, where the IP-in-UDP packet is encrypted by the WLAN adaptor using a link-layer encryption method; (3) when the IP-in-UDP packet passes through the AP, the AP decrypts it and forwards it to the SMG's intranet interface; and (4) after receiving the IP-in-UDP packet, the SMG decapsulates it and forwards the inner IP packet to the correspondent IP node using the intranet interface. Correspondingly, the inbound routing process is as follows: (1) an IP packet, of which the destination IP address is the mobile computer's home IP address, arrives at the SMG's intranet interface according to the Internet routing protocols; (2) the SMG encapsulates it into an UDP packet and forwards the IP-in-UDP packet to the IRC; (3) when the IP-in-UDP packet passes through the AP, the AP encrypts it using the link-layer encryption method and forwards it to the WLAN adaptor controlled by the IRC; (4) after receiving the IP-in-UDP packet, the WLAN adaptor decrypts it and passes it to the IRC; and (5) upon receiving the IP-in-UDP packet, the IRC decapsulates it, decrypts the inner IP packet, and passes the inner IP packet to the operating system.

3. Secure Mobility Gateway

The SMG is a special mobile IPsec gateway installed between the corporate intranet and the Internet. It is a combination of an HA and an IPsec gateway, and includes a processor and programmable memory for implementing these functions. The SMG has two network interfaces, one facing the Internet and the other facing the corporate intranet. The Internet interface is a harden host interface. It presents an IP host on the Internet, and only interacts with tunnel-mode IPsec packets, Mobile IP registration messages, and IKE messages. The intranet interface is a router interface. It presents a subnet of the corporate intranet. The IP address used by the operating system of every user's computer belongs to this subnet. This interface interacts with IP-in-UDP packets and Mobile IP registration messages.

If the user's computer is connected on the Internet through a home WLAN, a public WLAN, or a cellular network, the SMG receives Mobile IP registration messages and IKE messages from the Internet interface. In this scenario, all IP packets transmitted inside the UDP tunnel are encrypted. For IP-in-UDP packets transmitted from the user's computer to the SMG's Internet interface, the SMG decrypts the inner IP packets and forwards the decrypted IP packets to their final destinations through the intranet interface. For regular IP packets transmitted to the user's computer, which are received at the SMG's intranet interface, the SMG encrypts these IP packets, encapsulates them into UDP packets, and then transmitted them to the user's computer through the Internet interface.

If the user's computer is connected to the corporate intranet through an office WLAN, the SMG receives Mobile IP registration messages from the intranet interface. In this scenario, all IP packets transmitted inside the UDP tunnel are not encrypted from the SMG's viewpoint, because the encryption/decryption takes place between the SIA gateway and the user's computer (if the SIA gateway is adopted to protect the office WLAN) or between the AP and the user's computer (if the 802.1x-based AP is adopted to protect the office WLAN). For IP-in-UDP packets transmitted from the user's computer to the SMG's intranet interface, the SMG simply forwards the inner IP packets to their final destinations through the same interface. For regular IP packets transmitted to the user's computer, which are received at the SMG's intranet interface, the SMG encapsulates them into UDP packets, and then transmitted them to the user's computer through the intranet interface.

Both interfaces of the SMG must process IP-in-UDP packets (Internet interface processes encrypted IP-in-UDP packets and intranet interface processes unencrypted IP-in-UDP packets) due to the corporate firewall. If the SMG only processes encrypted IP-in-UDP packets using the Internet interface, the encrypted IP-in-UDP packets sent from the SMG's public interface to the user's network access device may be blocked by the firewall when the user's network access device is connected to an office WLAN.

The SMG includes a mobile status record for every network access device on the subnet, thus enabling it to function as a home agent. The mobile status record includes a Security Association Index number in the IP-in-UDP packets for each network access device. The Security Association enables the SMG to verify a message integrity code in the IP-in-UDP packet. The mobile status record is updated by replacing the current care-of IP address in the mobile status record with the outer source IP address of the IP-in-UDP packet, replacing the current interface in the mobile status record with the Internet interface if the current interface is the intranet interface for the first network access device, and replacing the packet sequence number for the first network access device in the mobile status record with the packet sequence number of the IP-in-UDP packet for the first network access device, if the packet sequence number of the IP-in-UDP packet is greater than the current packet sequence number stored in the mobile status record.

The Security Association Index is equivalent to SPI (Secure Policy Index). It is a 32-bit integer that identifies a Security Association data structure. It is stored in plain text and is located right before the encrypted IP packet. A Security Association contains a session key and other security-related parameters such as the expiration time. These are all IPsec terminologies. However, IPsec standard does not specify an IP-in-UDP encapsulation and encryption format (although various implementations did). An exemplary format can be represented by [outer IP header [outer UDP header [Security Association Index, Message Integrity Code, IRC packet sequence number, encrypted inner IP packet]]].

The message integrity code is a special hash code of the inner IP packet, the security association index, the IRC sequence number, and a session key specified in a Security Association. It is used to verify that the UDP payload has not been altered.

The sequence number is used to avoid wrongly updating the care-of address. For example, if a network access device leaves subnet 1 to subnet 2, it sends an IP-in-UDP packet to the secure mobility gateway; after a while, the mobile returns subnet 1, it sends another IP-in-UDP packet to the security mobility gateway. For some reason, if the first IP-in-UDP packet arrives later than the second one and there is no sequence number, the secure mobility gateway will think the most recent location of the mobile is at subnet 2. With the sequence number (which is incremented by one every time), the first IP-in-UDP packet has a smaller IRC sequence number, so it cannot update the care-of address. Thus, the secure mobility gateway can always have correct location information. The updating process is equivalent to the care-of address registration process in Mobile IP. In the present case, since there is no explicit care-of address registration process, each IP-in-UDP packet can serve this purpose.

4. Secure IP Access Gateway

The SIA gateway is a special IPsec gateway located between the corporate intranet and an office WLAN. It is an optional component in the Internet Roaming system architecture. If the office WLAN can be secured using an 802.1x-based method, no SIA gateway is needed. If the link-layer security solution cannot satisfy the security requirement for the office WLAN, the SIA gateway can be deployed behind every AP or at the choking point of a group of AP's.

The SIA gateway ties the IPsec tunnel establishment with the DHCP protocol. That is, mutual authentication and key generation messages are piggybacked as DHCP options with DHCP messages, and are exchanged between the IRC and the SIA gateway when the user's network access device applies for an IP address on the office WLAN. After two round trips of DHCP protocol conversations are finished, the mutual authentication is complete and a session key is generated if the mutual authentication is successful. Therefore, as soon as the user's network access device receives an IP address on the office WLAN, an IPsec SA between the user's network access device and the SIA gateway is established and thus all air traffic can thereafter be encrypted using the session key.

When the user's network access device is connected to the office WLAN controlled by the SIA gateway, the IRC maintains an unencrypted IP-in-UDP tunnel with the private interface of the SMG, but the inner IP packets are encrypted using the IPsec SA when the IP-in-UDP packets are transmitted between the user's network access device and the SIA gateway. The SIA gateway encrypts the inner IP packets of the IP-in-UDP packets sent to the user's network access device and decrypts the inner packets of the IP-in-UDP packets sent from the user's network access device.

The present invention has been shown in what are considered to be the most practical and preferred embodiments. It is anticipated, however, that departures may be made therefrom and that obvious modification will be implemented by those skilled in the art.

We claim:

1. A method of routing packets between a first network access device connected to the Internet through a first access network, and a second network access device, the method being performed at a secure mobility gateway having at least one Internet interface and at least one intranet interface, comprising the steps of:

receiving an encapsulated IP-in-UDP racket sent from the first network access device to the second network access device through the Internet interface, the IP packet being encrypted;

locating a mobile status record for the first network access device, wherein the mobile status record is located using a Security Association Index number in the encrypted IP-in-UDP packet;

verifying the IP-in-UDP packet based on a parameter contained in the IP-in-UDP packet and, if the parameter is valid, then updating the mobile status record by replacing a current care-of IP address in the mobile status record with an outer source IP address of the IP-in-UDP packet, replacing a current interface in the mobile status record with the Internet interface if the current interface is the intranet interface for the first network access device, and replacing a packet sequence number for the first network access device in the mobile status record with the packet sequence number of the IP-in-UDP packet for the first network access device, if the packet sequence number of the IP-in-UDP packet is greater than a current packet sequence number stored in the mobile status record;

decapsulating the IP-in-UDP packet;

decrypting the IP packet;

sending the unencrypted IP packet to the second network access device through an Intranet interface, as if the first network access device is deployed on a subnet of an Intranet that is represented by the Intranet interface;

receiving an IP packet sent from the second network access device to the first network access device at the Intranet interface;

locating a mobile status record using the destination IP address as an index;

encrypting the IP packet using the Security Association in the mobile status record;

encapsulating the IP packet into an IP-in-UDP packet; and sending the encrypted IP-in-UDP packet to the first network access device through the Internet interface.

2. A method of routing packets between a first network access device connected to the Internet through a first access network, and a second network access device, the method being performed at a secure mobility gateway having at least one Internet interface and at least one intranet interface, comprising the steps of:

receiving an encapsulated IP-in-UDP packet sent from the first network access device to the second network access device through the Internet interface, the IP packet being encrypted;

locating a mobile status record for the first network access device;

verifying the IP-in-UDP packet based on a parameter contained in the IP-in-UDP packet and, if the parameter is valid, then updating the mobile status record by replacing a current care-of IP address in the mobile status record with an outer source IP address of the IP-in-UDP packet, replacing a current interface in the mobile status record with the Internet interface if the current interface is the intranet interface for the first network access device, and replacing a packet sequence number for the first network access device in the mobile status record with a packet sequence number of the IP-in-UDP packet for the first network access device, if the packet sequence number of the IP-in-UDP packet is greater than the packet sequence number stored in the mobile status record;

decapsulating the IP-in-UDP packet;

decrypting the IP packet; and sending the unencrypted IP packet to the second network access device through an Intranet interface, as if the first network access device is deployed on a subnet of an Intranet that is represented by the Intranet interface, wherein the packet sent from the first network access device to the second network access device has respective source and destination IP addresses $IP_{MH}$ and $IP_{DST}$, and the encapsulated IP-in-UDP packet has respective source and destination IP addresses $IP_{local}$ and $IP_{SMG}$ and respective source and destination UDP port numbers $UDP_{local}$ and 434 respectively, and further wherein the encapsulated IP-in-UDP packet is received from a NAT box that changed the source IP address $IP_{local}$ to $IP_{NAPT}$, and the source UDP port number from $UDP_{local}$ to a port number $UDP_{NAPT}$.

3. The method recited in claim 2, further comprising the steps of:

receiving from the second network access device at the Intranet interface, an IP packet having respective source and destination IP addresses $IP_{DST}$ and $IP_{MH}$;

encrypting and encapsulating the IP packet received from the second network access device into a IP-in-UDP packet having respective source and destination addresses $IP_{SMG}$ and $IP_{NAPT}$ and respective source and destination UDP port numbers 434 and $UDP_{NAPT}$; and sending the encapsulated IP-in-UDP packet to the NAT box.

4. A method of routing packets between a first network access device connected to an Intranet through a private access network, and a second network access device, the method being performed at a secure IP access gateway and comprising the steps of:

receiving an encapsulated IP-in-UDP packet sent from the first network access device to the second network access device at a secure IP access gateway disposed between the private access network and the Intranet, the IP packet being encrypted using a session key negotiated between the first network access device and the secure IP access gateway, and the entire IP-in-UDP packet having a message integrity code generated using another session key specified by a Security Association in a mobile status record in a secure mobility gateway;

decrypting the IP packet at the secure IP access gateway, wherein the message integrity code of the IP-in-UDP packet remains unchanged;

sending the encapsulated IP-in-UDP packet to the secure mobility gateway having an Internet interface facing the Internet, and an Intranet interface facing the Intranet; the IP-in-UDP packet being sent to the Intranet interface;

locating a mobile status record using a Security Association Index number in the IP-in-UDP packet;

verifying the message integrity code of the IP-in-UDP packet based on the Security Association; and if it is valid, then updating the mobile status record by replacing a current care-of IP address in the mobile status record with an outer source IP address of the IP-in-UDP packet, replacing a current interface in the mobile status record with the Internet interface if the current interface is the intranet interface for the first network access device, and replacing a packet sequence number for the first network access device in the mobile status record with a packet sequence number of the IP-in-UDP Packet for the first network access device, if the packet sequence number of the IP-in-UDP packet is greater than the packet sequence number stored in the mobile status record;

decapsulating the IP-in-UDP packet at the secure mobility gateway;

sending the unencrypted IP packet to the second network access device through the Intranet interface, as if the first network access device is deployed on a subnet of the Intranet that is represented by the Intranet interface;

receiving an IP packet sent from the second network access device to the first network access device at the Intranet interface of the secure mobility gateway;

locating a mobile status record using the destination IP address as an index;

encapsulating the IP packet into an IP-in-UDP packet with the Security Association Index and a message integrity code at the secure mobility gateway;

sending the IP-in-UDP packet to the first network access device through the Intranet interface; and encrypting an inner IP packet of the IP-in-UDP packet using a session key negotiated between the first network access device and the secure IP access gateway when it passes the secure IP access gateway; the encrypted IP-in-UDP packet being sent to the first network access device over the private access network.

* * * * *